United States Patent
Grichnik et al.

(10) Patent No.: US 7,788,070 B2
(45) Date of Patent: Aug. 31, 2010

(54) PRODUCT DESIGN OPTIMIZATION METHOD AND SYSTEM

(75) Inventors: Anthony J. Grichnik, Peoria, IL (US); Andrea Brazzale-Anderson, Oswego, IL (US); Amar Patel, Dunlap, IL (US); Michael Seskin, Cardiff, CA (US); Stephan D. Roozenboom, Washington, IL (US); David M. Milam, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 600 days.

(21) Appl. No.: 11/882,015

(22) Filed: Jul. 30, 2007

(65) Prior Publication Data

US 2009/0037153 A1  Feb. 5, 2009

(51) Int. Cl.
*G06F 17/50* (2006.01)
(52) U.S. Cl. .......................................... 703/1
(58) Field of Classification Search ............... 703/1
See application file for complete search history.

(56) References Cited

U.S. PATENT DOCUMENTS

| | | | |
|---|---|---|---|
| 3,316,395 | A | 4/1967 | Lavin |
| 4,136,329 | A | 1/1979 | Trobert |
| 4,533,900 | A | 8/1985 | Muhlberger et al. |
| 5,014,220 | A | 5/1991 | McMann et al. |
| 5,163,412 | A | 11/1992 | Neu et al. |
| 5,262,941 | A | 11/1993 | Saladin et al. |
| 5,341,315 | A | 8/1994 | Niwa et al. |
| 5,386,373 | A | 1/1995 | Keeler et al. |
| 5,434,796 | A | 7/1995 | Weininger |
| 5,539,638 | A | 7/1996 | Keeler et al. |

(Continued)

FOREIGN PATENT DOCUMENTS

EP  1103926  5/2001

(Continued)

OTHER PUBLICATIONS

Masataka Yoshimura et al., "Strategic Product Development Decision-making Based on Optimization Incorporating the QFD Method", 2001, 10th International Conference on Precision Engineering, pp. 877-881.*

(Continued)

*Primary Examiner*—Paul L Rodriguez
*Assistant Examiner*—Russ Guill
(74) *Attorney, Agent, or Firm*—Finnegan, Henderson, Farabow, Garrett & Dunner (57) ABSTRACT

A method is provided for developing a product. The method includes obtaining data records from a plurality of stages of development of the product; identifying respective objectives of the plurality of stages and corresponding objective factors of the objectives; and determining common variables associated with the objectives based on the objective factors. The method includes selecting one or more input parameters based on the common variables and one or more output parameters based on the objectives; and updating the data records to generate desired data records indicative characteristics of the one or more input parameters and the one or more output parameters. The method includes generating a computational model indicative of interrelationships between the one or more input parameters and the one or more output parameters based on the data records; and providing a set of constraints to the computational model representative of a design of the product.

22 Claims, 5 Drawing Sheets

U.S. PATENT DOCUMENTS

| | | | |
|---|---|---|---|
| 5,548,528 A | 8/1996 | Keeler et al. |
| 5,561,610 A | 10/1996 | Schricker et al. |
| 5,566,091 A | 10/1996 | Schricker et al. |
| 5,585,553 A | 12/1996 | Schricker |
| 5,594,637 A | 1/1997 | Eisenberg et al. |
| 5,598,076 A | 1/1997 | Neubauer et al. |
| 5,604,306 A | 2/1997 | Schricker |
| 5,604,895 A | 2/1997 | Raimi |
| 5,608,865 A | 3/1997 | Midgely et al. |
| 5,666,297 A | 9/1997 | Britt et al. |
| 5,682,317 A | 10/1997 | Keeler et al. |
| 5,698,780 A | 12/1997 | Mizutani et al. |
| 5,727,128 A | 3/1998 | Morrison |
| 5,750,887 A | 5/1998 | Schricker |
| 5,752,007 A | 5/1998 | Morrison |
| 5,835,902 A | 11/1998 | Jannarone |
| 5,842,202 A | 11/1998 | Kon |
| 5,914,890 A | 6/1999 | Sarangapani et al. |
| 5,925,089 A | 7/1999 | Fujime |
| 5,950,147 A | 9/1999 | Sarangapani et al. |
| 5,966,312 A | 10/1999 | Chen |
| 5,987,976 A | 11/1999 | Sarangapani |
| 6,086,617 A | 7/2000 | Waldon et al. |
| 6,092,016 A | 7/2000 | Sarangapani et al. |
| 6,119,074 A | 9/2000 | Sarangapani |
| 6,145,066 A | 11/2000 | Atkin |
| 6,195,648 B1 | 2/2001 | Simon et al. |
| 6,199,007 B1 | 3/2001 | Zavarehi et al. |
| 6,208,982 B1 | 3/2001 | Allen, Jr. et al. |
| 6,223,133 B1 | 4/2001 | Brown |
| 6,236,908 B1 | 5/2001 | Cheng et al. |
| 6,240,343 B1 | 5/2001 | Sarangapani et al. |
| 6,269,351 B1 | 7/2001 | Black |
| 6,298,718 B1 | 10/2001 | Wang |
| 6,370,544 B1 | 4/2002 | Krebs et al. |
| 6,405,122 B1 | 6/2002 | Yamaguchi |
| 6,438,430 B1 | 8/2002 | Martin et al. |
| 6,442,511 B1 | 8/2002 | Sarangapani et al. |
| 6,477,660 B1 | 11/2002 | Sohner |
| 6,513,018 B1 | 1/2003 | Culhane |
| 6,536,935 B2 * | 3/2003 | Parunak et al. ............... 700/99 |
| 6,546,379 B1 | 4/2003 | Hong et al. |
| 6,584,768 B1 | 7/2003 | Hecker et al. |
| 6,594,989 B1 | 7/2003 | Hepburn et al. |
| 6,698,203 B2 | 3/2004 | Wang |
| 6,711,676 B1 | 3/2004 | Zomaya et al. |
| 6,721,606 B1 | 4/2004 | Kaji et al. |
| 6,725,208 B1 | 4/2004 | Hartman et al. |
| 6,763,708 B2 | 7/2004 | Ting et al. |
| 6,775,647 B1 | 8/2004 | Evans et al. |
| 6,785,604 B2 | 8/2004 | Jacobson |
| 6,810,442 B1 | 10/2004 | Lin et al. |
| 6,823,675 B2 | 11/2004 | Brunell et al. |
| 6,859,770 B2 | 2/2005 | Ramsey |
| 6,859,785 B2 | 2/2005 | Case |
| 6,865,883 B2 | 3/2005 | Gomulka |
| 6,882,929 B2 | 4/2005 | Liang et al. |
| 6,895,286 B2 | 5/2005 | Kaji et al. |
| 6,935,313 B2 | 8/2005 | Jacobson |
| 6,941,287 B1 | 9/2005 | Vaidyanathan et al. |
| 6,952,662 B2 | 10/2005 | Wegerich et al. |
| 6,976,062 B1 | 12/2005 | Denby et al. |
| 7,000,229 B2 | 2/2006 | Gere |
| 7,024,343 B2 | 4/2006 | El-Ratal |
| 7,027,953 B2 | 4/2006 | Klein |
| 7,035,834 B2 | 4/2006 | Jacobson |
| 7,117,079 B2 | 10/2006 | Streichsbier et al. |
| 7,124,047 B2 | 10/2006 | Zhang et al. |
| 7,127,892 B2 | 10/2006 | Akins et al. |
| 7,174,284 B2 | 2/2007 | Dolansky et al. |
| 7,178,328 B2 | 2/2007 | Solbrig |
| 7,191,161 B1 | 3/2007 | Rai et al. |
| 7,194,392 B2 | 3/2007 | Tuken et al. |
| 7,213,007 B2 | 5/2007 | Grichnik |
| 7,356,393 B1 | 4/2008 | Schlatre et al. |
| 7,369,925 B2 | 5/2008 | Morioka et al. |
| 2002/0014294 A1 | 2/2002 | Okano et al. |
| 2002/0016701 A1 | 2/2002 | Duret et al. |
| 2002/0042784 A1 | 4/2002 | Kerven et al. |
| 2002/0049704 A1 | 4/2002 | Vanderveldt et al. |
| 2002/0103996 A1 | 8/2002 | LeVasseur et al. |
| 2002/0198821 A1 | 12/2002 | Munoz |
| 2003/0018503 A1 | 1/2003 | Shulman |
| 2003/0055607 A1 | 3/2003 | Wegerich et al. |
| 2003/0093250 A1 | 5/2003 | Goebel |
| 2003/0126053 A1 | 7/2003 | Boswell et al. |
| 2003/0126103 A1 | 7/2003 | Chen et al. |
| 2003/0130855 A1 | 7/2003 | Babu et al. |
| 2003/0167354 A1 | 9/2003 | Peppers et al. |
| 2003/0187567 A1 | 10/2003 | Sulatisky et al. |
| 2003/0187584 A1 | 10/2003 | Harris |
| 2003/0200296 A1 | 10/2003 | Lindsey |
| 2004/0030420 A1 | 2/2004 | Ulyanov et al. |
| 2004/0034857 A1 | 2/2004 | Mangino et al. |
| 2004/0059518 A1 | 3/2004 | Rothschild |
| 2004/0077966 A1 | 4/2004 | Yamaguchi et al. |
| 2004/0122702 A1 | 6/2004 | Sabol et al. |
| 2004/0122703 A1 | 6/2004 | Walker et al. |
| 2004/0128058 A1 | 7/2004 | Andres et al. |
| 2004/0135677 A1 | 7/2004 | Asam |
| 2004/0138995 A1 | 7/2004 | Hershkowitz et al. |
| 2004/0153227 A1 | 8/2004 | Hagiwara et al. |
| 2004/0230404 A1 | 11/2004 | Messmer et al. |
| 2004/0267818 A1 | 12/2004 | Hartenstine |
| 2005/0047661 A1 | 3/2005 | Mauer |
| 2005/0055176 A1 | 3/2005 | Clarke et al. |
| 2005/0091093 A1 | 4/2005 | Bhaskaran et al. |
| 2005/0209943 A1 | 9/2005 | Ballow et al. |
| 2005/0210337 A1 | 9/2005 | Chester et al. |
| 2005/0240539 A1 | 10/2005 | Olavson |
| 2005/0261791 A1 | 11/2005 | Chen et al. |
| 2005/0262031 A1 | 11/2005 | Saidi et al. |
| 2005/0278227 A1 | 12/2005 | Esary et al. |
| 2005/0278432 A1 | 12/2005 | Feinleib et al. |
| 2006/0010057 A1 | 1/2006 | Bradway et al. |
| 2006/0010142 A1 | 1/2006 | Kim et al. |
| 2006/0010157 A1 | 1/2006 | Dumitrascu et al. |
| 2006/0025897 A1 | 2/2006 | Shostak et al. |
| 2006/0026270 A1 | 2/2006 | Sadovsky et al. |
| 2006/0026587 A1 | 2/2006 | Lemarroy et al. |
| 2006/0064474 A1 | 3/2006 | Feinleib et al. |
| 2006/0068973 A1 | 3/2006 | Kappauf et al. |
| 2006/0129289 A1 | 6/2006 | Kumar et al. |
| 2006/0130052 A1 | 6/2006 | Allen et al. |
| 2006/0229753 A1 | 10/2006 | Seskin et al. |
| 2006/0229769 A1 | 10/2006 | Grichnik et al. |
| 2006/0229852 A1 | 10/2006 | Grichnik et al. |
| 2006/0229854 A1 | 10/2006 | Grichnik et al. |
| 2006/0230018 A1 | 10/2006 | Grichnik et al. |
| 2006/0230097 A1 | 10/2006 | Grichnik et al. |
| 2006/0230313 A1 | 10/2006 | Grichnik et al. |
| 2006/0241923 A1 | 10/2006 | Xu et al. |
| 2006/0247798 A1 | 11/2006 | Subbu et al. |
| 2007/0061144 A1 | 3/2007 | Grichnik et al. |
| 2007/0094048 A1 | 4/2007 | Grichnik |
| 2007/0094181 A1 | 4/2007 | Tayebnejad et al. |
| 2007/0118338 A1 | 5/2007 | Grichnik et al. |
| 2007/0124237 A1 | 5/2007 | Sundararajan et al. |
| 2007/0150332 A1 | 6/2007 | Grichnik et al. |
| 2007/0168494 A1 | 7/2007 | Liu et al. |
| 2007/0179769 A1 | 8/2007 | Grichnik et al. |
| 2007/0203864 A1 | 8/2007 | Grichnik |

2008/0154811 A1 6/2008 Grichnik et al.

FOREIGN PATENT DOCUMENTS

| EP | 1367248 | 12/2003 |
|---|---|---|
| EP | 1418481 | 5/2004 |
| JP | 10-332621 | 12/1998 |
| JP | 11-351045 | 12/1999 |
| JP | 2002-276344 | 9/2002 |
| WO | WO97/42581 | 11/1997 |
| WO | WO02/057856 | 7/2002 |
| WO | WO2006/017453 | 2/2006 |

OTHER PUBLICATIONS

Moo Ho Lee et al., "Hierarchical on-line data reconciliation and optimization for an industrial utility plant", 1998, Computers and Chemical Engineering, vol. 22, pp. S247-S254.*

Behzad D. Mottahed et al., "Optimal Design of Electronic System Utilizing an Integrated Multidisciplinary Process", 2000, IEEE Transactions on Advanced Packaging, vol. 23, No. 4, pp. 699-707.*

Brahma et al., "Optimization of Diesel Engine Operating Parameters Using Neural Networks," SAE Technical Paper Series, 2003-01-3228, Oct. 27-30, 2003 (11 pages).

Grichnik et al., "An Improved Metric for Robust Engineering," Proceedings of the 2007 International Conference on Scientific Computing, Las Vegas, NV (4 pages).

Wu et al., "Cam-phasing Optimization Using Artificial Neural Networks as Surrogate Models—Fuel Consumption and NOx Emissions," SAE Technical Paper Series, 2006-01-1512, Apr. 3-6, 2006 (19 pages).

Allen et al., "Supersaturated Designs That Maximize the Probability of Identifying Active Factors," 2003 American Statistical Association and the American Society for Quality, Technometrics, vol. 45, No. 1, Feb. 2003, pp. 1-8.

April, Jay et al., "Practical Introduction to Simulation Optimization," Proceedings of the 2003 Winter Simulation Conference, pp. 71-78.

Bandte et al., "Viable Designs Through a Joint Probabilistic Estimation Technique," SAE International, and the American Institute of Aeronautics and Astronautics, Inc., Paper No. 1999-01-5623, 1999, pp. 1-11.

Beisl et al., "Use of Genetic Algorithm to Identify the Source Point of Seepage Slick Clusters Interpreted from Radarsat-1 Images in the Gulf of Mexico," Geoscience and Remote Sensing Symposium, 2004, Proceedings, 2004 IEEE International Anchorage, AK, Sep. 20-24, 2004, vol. 6, Sep. 20, 2004, pp. 4139-4142.

Berke et al., "Optimum Design of Aerospace Structural Components Using Neural Networks," Computers and Structures, vol. 48, No. 6, Sep. 17, 1993, pp. 1001-1010.

Bezdek, "Genetic Algorithm Guided Clustering," IEEE 0-7803-1899-4/94, 1994, pp. 34-39.

Chau et al., "Use of runs test to access cardiovascular autonomic function in diabetic subjects," Abstract, Diabetes Care, vol. 17, Issue 2, pp. 146-148, available at http://care.diabetesjournals.org/cgi/content/abstract/17/2/146), 1994.

Chung et al., "Process Optimal Design in Forging by Genetic Algorithm," Journal of Manufacturing Science and Engineering, vol. 124, May 2002, pp. 397-408.

Cox et al., "Statistical Modeling for Efficient Parametric Yield Estimation of MOS VLSI Circuits," IEEE, 1983, pp. 242-245.

De Maesschalck et al., "The Mahalanobis Distance," Chemometrics and Intelligent Laboratory Systems, vol. 50, No. 1, Jan. 2000, pp. 1-18.

Dikmen et al., "Estimating Distributions in Genetic Algorithms," ISCIS 2003, LNCS 2869, 2003, pp. 521-528.

Galperin, G, et al., "Parallel Monte-Carlo Simulation of Neural Network Controllers," available at http://www-fp.mcs.anl.gov/ccst/research/reports_pre1998/neural_network/galperin.html, printed Mar. 11, 2005 (6 pages).

Gletsos et al., "A Computer-Aided Diagnostic System to Characterize CT Focal Liver Lesions: Design and Optimization of a Neural Network Classifier," IEEE Transactions on Information Technology in Biomedicine, vol. 7, No. 3, Sep. 2003 pp. 153-162.

Grichnik et al., Copending U.S. Appl. No. 11/529,267, filed Sep. 29, 2006, entitled Virtual Sensor Based Engine Control System and Method.

Grichnik et al., Copending U.S. Appl. No. 11/730,363, filed Mar. 30, 2007, entitled Prediction Based Engine Control System and Method.

Grichnik et al., Copending U.S. Appl. No. 11/812,164, filed Jun. 15, 2007, entitled Virtual Sensor System and Method.

Grichnik et al., Copending U.S. Appl. No. 11/979,408, filed Nov. 2, 2007, entitled Virtual Sensor Network (VSN) System and Method.

Holland, John H., "Genetic Algorithms," Scientific American, Jul. 1992, pp. 66-72.

Hughes et al., "Linear Statistics for Zeros of Riemann's Zeta Function," C.R. Acad. Sci. Paris, Ser. 1335 (2002), pp. 667-670.

Ko et al., "Application of Artificial Neural Network and Taguchi Method to Perform Design in Metal Forming Considering Workability," International Journal of Machine Tools & Manufacture, vol. 39, No. 5, May 1999, pp. 771-785.

Kroha et al., "Object Server on a Parallel Computer," 1997 IEEE 0-8186-8147-0/97, pp. 284-288.

Mavris et al., "A Probabilistic Approach to Multivariate Constrained Robust Design Simulation," Society of Automotive Engineers, Inc., Paper No. 975508, 1997, pp. 1-11.

National Institute of Health, "10-year CVD Risk Calculator" available at http://hin.nhlbi.nih.gov/atpiii/calculator.asp?usertype=prof, printed Aug. 2, 2005, 2 pages.

Obayashi et al, "Multiobjective Evolutionary Computation for Supersonic Wing-Shape Optimization," IEEE Transactions on Evolutionary Computation, vol. 4, No. 2, Jul. 2000, pp. 182-187.

Simpson et al., "Metamodels for Computer-Based Engineering Design: Survey & Recommendations," Engineering with Computers, 2001, vol. 17, pp. 129-150.

Solar Turbines, "InSight System," Oct. 19, 2006, http://mysolar.cat.com.

Solar Turbines, "InSight Systems, Machinery Management Solutions," Oct. 19, 2006.

Song et al., "The Hyperellipsoidal Clustering Using Genetic Algorithm," 1997 IEEE International Conference on Intelligent Processing Systems, Oct. 28-31, 1997, Beijing, China, pp. 592-596.

Sytsma, Sid, "Quality and Statistical Process Control," available at http://www.sytsma.com/tqmtools/ctlchtprinciples.html, printed Apr. 7, 2005, 6 pages.

Taguchi et al., "The Mahalanobis-Taguchi Strategy," A Pattern Technology System, John Wiley & Sons, Inc, 2002, 234 pages.

Taylor et al., "Guidelines for Evaluating and Expressing the Uncertainty of NIST Measurement Results," NIST Technical Note 1297, 1994 Edition, United States Dept. of Commerce, National Institute of Standards and Technology (25 pages).

Thompson, G.J. et al., "Neural Network Modelling of the Emissions and Performance of a Heavy-Duty Diesel Engine," Proc Instu. Mech. Engrs., vol. 214, Part D (2000), pp. 111-126.

Traver, Michael L. et al., "A Neural Network-Based Virtual NOx Sensor for Diesel Engines," West Virginia University, Mechanical and Aerospace Engineering Dept., Morgantown, WV, 7 pages, 1999.

Traver, Michael L. et al., "Neural Network-Based Diesel Engine Emissions Prediction Using In-Cylinder Combustion Pressure," International Spring Fuels & Lubricants Meeting & Exposition, SAE Technical Paper Series, May 3-6, 1999, 17 pages.

Woodall, Tsui et al., "A Review and Analysis of the Mahalanobis-Taguchi System," Technometrics, Feb. 2003, vol. 45, No. 1 (15 pages).

Yang et al., "Similar Cases Retrieval from the Database of Laboratory Test Results," Journal of Medical Systems, vol. 27, No. 3, Jun. 2003, pp. 271-282.

Yuan et al., "Evolutionary Fuzzy C-Means Clustering Algorithm," 1995 IEEE 0-7803-2461-7/95, pp. 2221-2226.

* cited by examiner

PRODUCT DESIGN OPTIMIZATION METHOD AND SYSTEM

TECHNICAL FIELD

This disclosure relates generally to product design systems and, more particularly, to probabilistic design based modeling systems for use in product design applications with data pre-processing techniques.

BACKGROUND

Many computer-based applications exist for aiding in the design of products. Using these applications, an engineer can construct a computer model of a particular product and can analyze the behavior of the product through various analysis techniques. Further, certain analytical tools have been developed that enable engineers to evaluate and test multiple design configurations of a product. While these analytical tools may include internal optimization algorithms to provide this functionality, these tools generally represent only domain specific designs. Therefore, while product design variations can be tested and subsequently optimized, these design variations are typically optimized with respect to only a single requirement within a specific domain.

Finite element analysis (FEA) applications may fall into this domain specific category. With FEA applications, an engineer can test various product designs against requirements relating to stress and strain, vibration response, modal frequencies, and stability. Because the optimizing algorithms included in these FEA applications can optimize design parameters only with respect to a single requirement, however, multiple design requirements must be transformed into a single function for optimization. For example, in FEA analysis, one objective may be to parameterize a product design such that stress and strain are minimized. Because the FEA software cannot optimize both stress and strain simultaneously, the stress and strain design requirements may be transformed into a ratio of stress to strain (i.e., the modulus of elasticity). In the analysis, this ratio becomes the goal function to be optimized.

Several drawbacks result from this approach. For example, because more than one output requirement is transformed into a single goal function, the underlying relationships and interactions between the design parameters and the response of the product system are hidden from the design engineer. Further, based on this approach, engineers may be unable to optimize their designs according to competing requirements.

Thus, there is a need for modeling and analysis applications that can establish heuristic models between design inputs and outputs, subject to defined constraints, and optimize the inputs such that the probability of compliance of multiple competing outputs is maximized. There is also a need for applications that can explain the causal relationship between design inputs and outputs. Further, there is a need for applications that can collect desired patterns of design inputs to reduce computational load required by the optimization.

Certain applications have been developed that attempt to optimize design inputs based on multiple competing outputs. For example, U.S. Pat. No. 6,086,617 ("the '617 patent") issued to Waldon et al. on Jul. 11, 2000, describes an optimization design system that includes a directed heuristic search (DHS). The DHS directs a design optimization process that implements a user's selections and directions. The DHS also directs the order and directions in which the search for an optimal design is conducted and how the search sequences through potential design solutions.

While the optimization design system of the '617 patent may provide a multi-dimension solution for product design optimization, this system has several shortcomings. The efficiency of this system is hindered by the need to pass through slow simulation tools in order to generate each new model result. Further, there is no knowledge in the system model of how variation in the input parameters relates to variation in the output parameters. The system of the '617 patent provides only single point solutions, which may be inadequate especially where a single point optimum may be unstable when subject to variability introduced by a manufacturing process or other sources. Further, the system of the '617 patent is limited in the number of dimensions that can be simultaneously optimized and searched.

Moreover, a product development process may be constrained by a variety of factors, such as cost, performance, and quality. These factors may often be considered separately during different stages of the product development process and may require knowledge from different domains. The '617 patent fails to consider such multiple domain knowledge characteristics when performing product design modeling and optimization. Further, '617 patent also fails to address means to efficiently and accurately represent these domain knowledge or domain limitation variables during the product design modeling and optimization.

Methods and systems consistent with certain features of the disclosed systems are directed to solving one or more of the problems set forth above.

SUMMARY OF THE INVENTION

One aspect of the present disclosure includes a method for developing a product. The method may include obtaining data records from a plurality of stages of development of the product; identifying respective objectives of the plurality of stages and corresponding objective factors of the objectives; and determining common variables associated with the objectives based on the objective factors. The method may also include selecting one or more input parameters based on the common variables and one or more output parameters based on the objectives; and updating the data records to generate desired data records indicative of characteristics of the one or more input parameters and the one or more output parameters. Further, the method may include generating a computational model indicative of interrelationships between the one or more input parameters and the one or more output parameters based on the data records; and providing a set of constraints to the computational model representative of a design of the product.

Another aspect of the present disclosure includes a computer-based product design system. The design system may include a database and a processor. The database may contain data records relating to a plurality of stages of development of the product. The processor may be configured to obtain the data records associated with the plurality of stages and to identify respective objectives of the plurality of stages and corresponding objective factors of the objectives. The processor may also be configured to determine common variables associated with the objectives based on the objective factors and to select one or more input parameters based on the common variables and one or more output parameters based on the objectives. Further, the processor may be configured to update the data records to generate desired data records indicative of characteristics of the one or more input parameters and the one or more output parameters; to generate a computational model indicative of interrelationships between the one or more input parameters and the one or more output parameters based on the data records; and to provide a set of constraints to the computational model representative of a design of the product.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
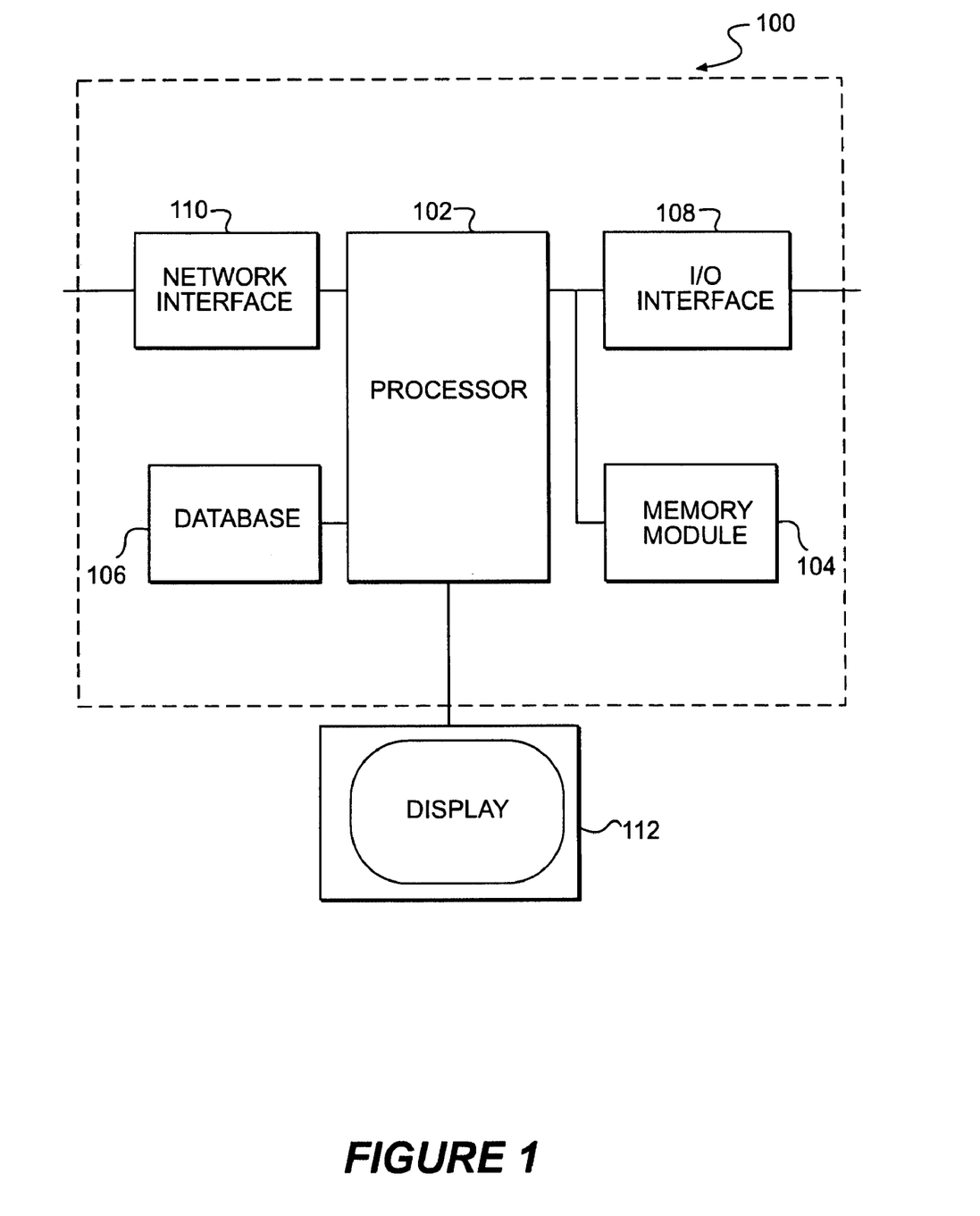
FIG. 1 is a block diagram representation of a product design system according to an exemplary disclosed embodiment.

FIG. 1 provides a block diagram representation of a product design system 100 for generating a design of a product. A product may refer to any entity that includes at least one part or component, or multiple parts assembled together to form an assembly. Non-limiting examples of products include machines, engines, automobiles, aircraft, boats, appliances, electronics, and any sub-components, sub-assemblies, or parts thereof. Further, a product may also refer to any non-tangible entity such as a computer software program. For example, a product may include a financial analysis system, or a medical prognostic tool, etc.

A product design may be represented as a set of one or more input parameter values. These parameters may correspond to dimensions, tolerances, moments of inertia, mass, material selections, or any other characteristic affecting one or more properties of the product. The disclosed product design system 100 may be configured to provide a probabilistic product design such that one or more input parameters can be expressed as nominal values and corresponding statistical distributions. Similarly, the product design may include nominal values for one or more output parameters and corresponding statistical distributions. The statistical distributions of the output parameters may provide an indication of the probability that the product design complies with a desired set of output requirements.

Product design system 100 may include a processor 102, a memory module 104, a database 106, an I/O interface 108, and a network interface 110. Product design system 100 may also include a display 112. Any other components suitable for receiving and interacting with data, executing instructions, communicating with one or more external workstations, displaying information, etc., may also be included in product design system 100.

Processor 102 may include any appropriate type of general purpose microprocessor, digital signal processor, or microcontroller. Memory module 104 may include one or more memory devices including, but not limited to, a ROM, a flash memory, a dynamic RAM, and a static RAM. Memory module 104 may be configured to store information accessed and used by processor 102. Database 106 may include any type of appropriate database containing information relating to characteristics of input parameters, output parameters, mathematical models, and/or any other control information. I/O interface 108 may be connected to various data input devices (e.g., keyboards, pointers, drawing tablets, etc.)(not shown) to provide data and control information to product design system 100. Network interface 110 may include any appropriate type of network adaptor capable of communicating with other computer systems based on one or more communication protocols. Display 112 may include any type of device (e.g., CRT monitors, LCD screens, etc.) capable of graphically depicting information.

Figure 2:
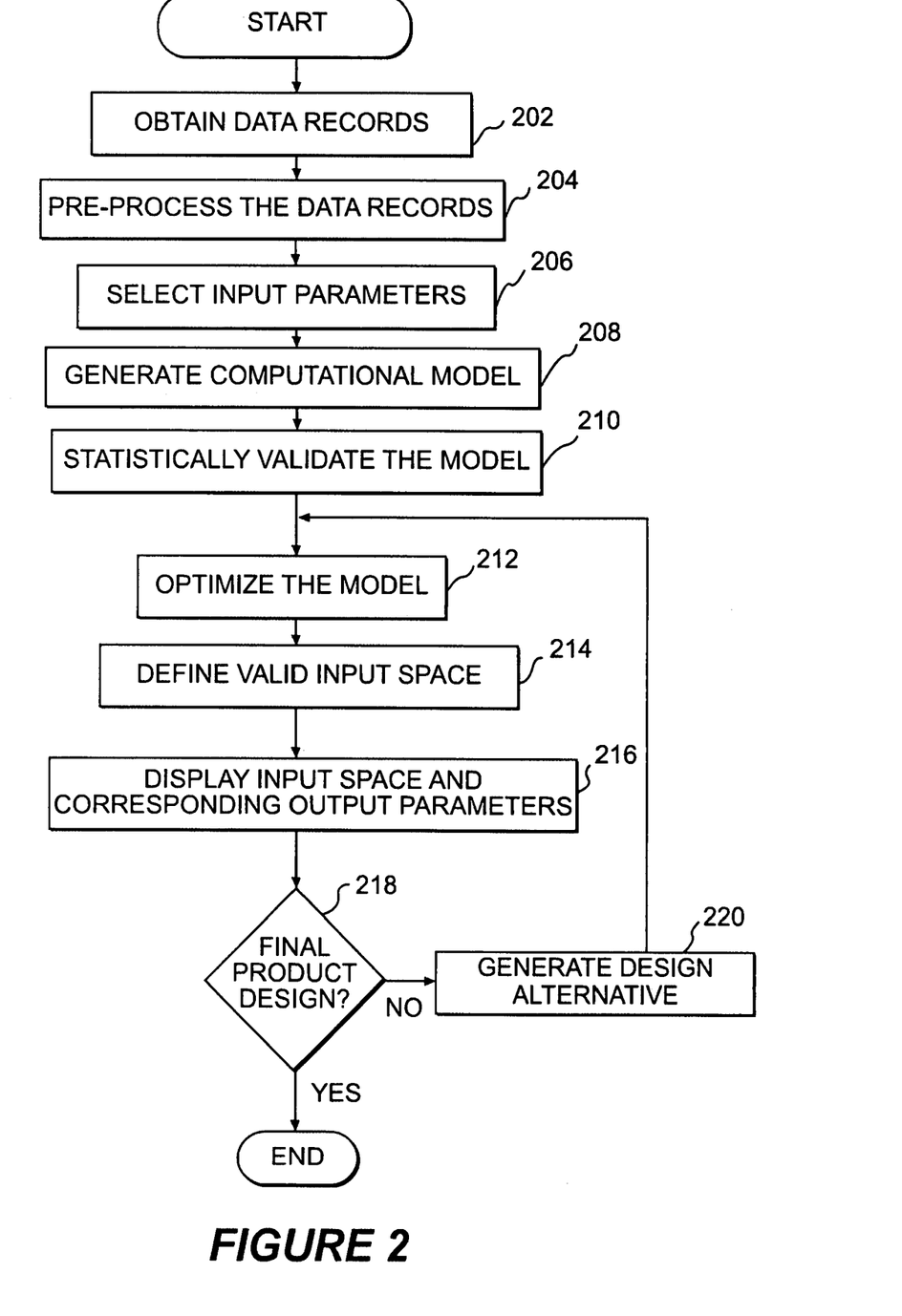
FIG. 2 is a flow chart representing an exemplary disclosed method for designing a product consistent with certain disclosed embodiments.

FIG. 2 provides a flow chart representing an exemplary disclosed method for designing a product using product design system 100. At step 202, product design system may obtain data records relating to input variables and output parameters associated with a product to be designed. An input variable may refer to any non-output parameter that is associated with the data records. The total number of input variables may be greater than the total number of input parameters, which are selected to represent or to be associated with the product design.

The data records may reflect characteristics of the input parameters and output parameters, such as statistical distributions, normal ranges, and/or tolerances, etc. For each data record, there may be a set of output parameter values that corresponds to a particular set of input variable values. The data records may represent pre-generated data that has been stored, for example, in database 106. The data may be computer generated or empirically collected through testing of actual products.

For example, the data records may be previously collected during a certain time period from a test product. The data records may also be collected from experiments designed for collecting such data. Alternatively, the data records may be generated artificially by other related processes, such as other design processes. The data records may also include training data and testing data used to train and validate certain process models associated with the product design. In addition, the data records may include simulation data used to observe and optimize the process models associated with the product design.

In one embodiment, the data records may be generated in the following manner. For a particular product to be designed, a design space of interest may be identified. A plurality of sets of random values may be generated for various input variables that fall within the desired product design space. Alternatively, non-random patterns of input data, such as those from designed experiments, may be used. The designed experiments may be conducted by using methods such as full and fractional factorial designs, Taguchi arrays, Box-Behnken designs, resolution surface map (RSM) designs, central composite patterns, Latin squares, and D- or A-optimal designs, etc. The resulting values may be supplied to at least one simulation algorithm to generate values for one or more output parameters related to the input variables. The at least one simulation algorithm may be associated with, for example, systems for performing finite element analysis, computational fluid dynamics analysis, radio frequency simulation, electromagnetic field simulation, electrostatic discharge simulation, network propagation simulation, discrete event simulation, constraint-based network simulation, or any other appropriate type of dynamic simulation. Additional output parameters may also be included to represent effects on product cost, quality and durability driven by input variable selections. These input variable selections may include similar variables to those relevant to performance considerations or may be unique considerations to cost or quality of products.

At step 204, the data records may be pre-processed. Processor 102 may pre-process the data records to clean up the data records for obvious errors and to eliminate redundancies. Processor 102 may remove approximately identical data records and/or remove data records that are out of a reasonable range in order to be meaningful for model generation and optimization. For randomly generated data records, any cases deemed statistically unlikely based on variable covariance terms may be eliminated.

Processor 102 may also pre-process the data records to make the data records to more accurately reflect characteristics of the product design or an existing product, especially when the data records contain data of time series or contain a large number of input variables.

In certain embodiments, a product design, such as a medical application or a complex engine application, the data records may include a large number of input variables. A large number of input variables may significantly increase computational load of the product design system. After the data records have been pre-processed, processor 102 may then select proper input parameters at step 206 by analyzing the data records.

The data records may include many input variables. In certain situations, for example, where the data records are obtained through experimental observations, the number of input variables may exceed the number of the data records and lead to sparse data scenarios. In these situations, the number of input variables may need to be reduced to create mathematical models within practical computational time limits and that contain enough degrees of freedom to map the relationship between inputs and outputs. In certain other situations, however, where the data records are computer generated using domain specific algorithms, there may be less of a risk that the number of input variables exceeds the number of data records. That is, in these situations, if the number of input variables exceeds the number of data records, more data records may be generated using the domain specific algorithms. Thus, for computer generated data records, the number of data records can be made to exceed, and often far exceed, the number of input variables. For these situations, the input parameters selected for use in step 206 may correspond to the entire set of input variables.

Where the number on input variables exceeds the number of data records, and it would not be practical or cost-effective to generate additional data records, processor 102 may select input parameters at step 206 according to predetermined criteria. For example, processor 102 may choose input parameters by experimentation and/or expert opinions. Alternatively, in certain embodiments, processor 102 may select input parameters based on a mahalanobis distance between a normal data set and an abnormal data set of the data records. The normal data set and abnormal data set may be defined by processor 102 by any suitable method. For example, the normal data set may include characteristic data associated with the input parameters that produce desired output parameters. On the other hand, the abnormal data set may include any characteristic data that may be out of tolerance or may need to be avoided. The normal data set and abnormal data set may be predefined by processor 102.

Mahalanobis distance may refer to a mathematical representation that may be used to measure data profiles based on correlations between parameters in a data set. Mahalanobis distance differs from Euclidean distance in that mahalanobis distance takes into account the correlations of the data set. Mahalanobis distance of a data set X (e.g., a multivariate vector) may be represented as $$MD_i = (X_i - \mu_x)\Sigma^{-1}(X_i - \mu_x)' \quad (1)$$

where $\mu_x$ is the mean of X and $\Sigma^{-1}$ is an inverse variance-covariance matrix of X. $MD_i$ weights the distance of a data point $X_i$ from its mean $\mu_x$ such that observations that are on the same multivariate normal density contour will have the same distance. Such observations may be used to identify and select correlated parameters from separate data groups having different variances.

Processor 102 may select a desired subset of input parameters such that the mahalanobis distance between the normal data set and the abnormal data set is maximized or optimized. A genetic algorithm may be used by processor 102 to search the input parameters for the desired subset with the purpose of maximizing the mahalanobis distance. Processor 102 may select a candidate subset of the input parameters based on a predetermined criteria and calculate a mahalanobis distance $MD_{normal}$ of the normal data set and a mahalanobis distance $MD_{abnormal}$ of the abnormal data set. Processor 102 may also calculate the mahalanobis distance between the normal data set and the abnormal data (i.e., the deviation of the mahalanobis distance $MD_x = MD_{normal} - MD_{normal}$). Other types of deviations, however, may also be used.

Processor 102 may select the candidate subset of the input parameters if the genetic algorithm converges (i.e., the genetic algorithm finds the maximized or optimized mahalanobis distance between the normal data set and the abnormal data set corresponding to the candidate subset). If the genetic algorithm does not converge, a different candidate subset of the input parameters may be created for further searching. This searching process may continue until the genetic algorithm converges and a desired subset of the input parameters is selected.

Figure 3:
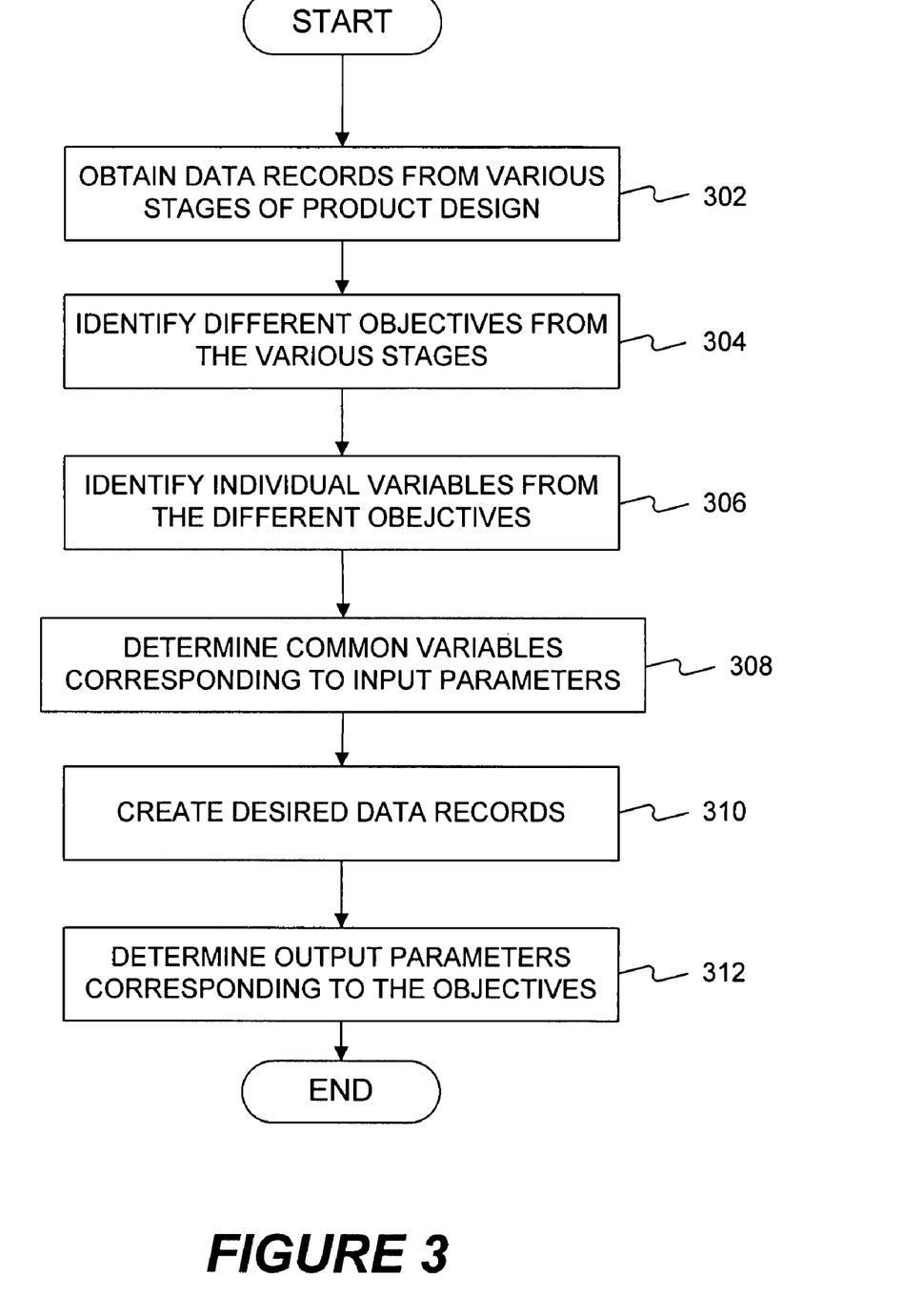
FIG. 3 shows an exemplary data optimization process consistent with the disclosed embodiments.

In certain embodiments, the data records may be obtained during different stages of product design and development process. Different stages may use different models and may focus on different objectives. For example, during product development, a product design model may focus on balancing competing performance requirements of the product design, while a manufacturing model may focus on cost/quality tradeoffs of the product manufactured. Under certain circumstances, these objectives may be discontinued or inconsistent among the different stages, particularly when different models are used. In other circumstances, it may be desirable or advantageous to simultaneously consider cost, quality and performance characteristics. Processor 102 may perform a data optimization process to determine input and/or output parameters. FIG. 3 shows an exemplary data optimization process consistent with the disclosed embodiments.

As shown in FIG. 3, processor 102 may obtain data records from various stages of the product design and development process (step 302). For example, processor 102 may obtain the data records from a strategy stage, a concept design stage, a development stage, a pilot production stage, and a production stage, etc. Processor 102 may also identify different objectives from the various stages (step 304). For example, processor 102 may identify product related objectives, such as performance, quality, and cost, etc., from the strategy stage, the concept design stage, the development stage, the pilot production stage, and the production stage, etc. Other objectives may also be used.

The term "performance," as used herein, may refer to any operational and support characteristics of the product designed to effectively and efficiently perform desired functions of the designed product. The performance may be quantitatively measured over a physical or functional attribute relating to the performing of the desired functions. The performance may also be associated with or correlated to features of the designed product, i.e., the performance factors of the designed product. For example, performance factors of the designed product (e.g., an engine system, etc.) may include operating modes, emissions and environmental factors, applications and ratings, manufacturing processes, geometry and tolerances, component features, and material properties, etc. Other performance factors may also be included.

The term "quality" may refer to any inherent or distinctive characteristics or properties of the designed product, such as a totality of features and characteristics of an engine system or a financial service that is essential to desired operational result of the engine system or the financial service. Quality may be represented in any appropriate financial and/or non-financial terms. For example, quality may be represented by durability, warranty exposure, and/or defect over unit ratio, etc. On the other hand, quality factors of the designed product related to operating and supporting the designed product may include applications and ratings, customer support, dealer support, geometry and tolerances, component features, material properties, and manufacturing facility, etc.

Further, the term "cost" may refer to any feature, operation, or characteristics of the product designed that can be measured in or have effect on monetary terms. Cost factors of the designed product may include manufacturing processes, material sourcing, quantity and volume, geometry and tolerances, component features, material properties, and manufacturing facility, etc. It is understood that the above objectives and associated factors are used only for illustrative purposes, other objectives and/or factors may also be used.

After identifying product related objectives (e.g., performance, quality, and cost, etc.) (step 304), processor 102 may identify individual variables associated with the different objectives (step 306). For example, processor 102 may identify the individual variable from the objective factors. Processor 102 may determine the individual variables including, for example, operating modes, emissions and environmental factors, applications and ratings, manufacturing processes, geometry and tolerances, component features, material properties, customer support, dealer support, manufacturing facility, material sourcing, and quantity and volume, etc., from objective factors of the various objectives. Other variables may also be included.

Further, processor 102 may also determine common variables from the individual variables (step 308). A common variable may correspond to an objective factor associated with all identified objectives or with most important objectives. For example, processor 102 may determine common variables such as geometry and tolerances, component features, and material properties, etc., which are included in objective factors of performance, quality, and cost objectives. Other common variables may also be used. Processor 102 may also select input parameters based on the common variables. For example, processor 102 may select all the common variables as the input parameters. Alternatively, if a total number of the common variables is large, processor 102 may apply the Mahalanobis distance-based preprocessing method, as previously described, before or after this data optimization process.

Figure 4:
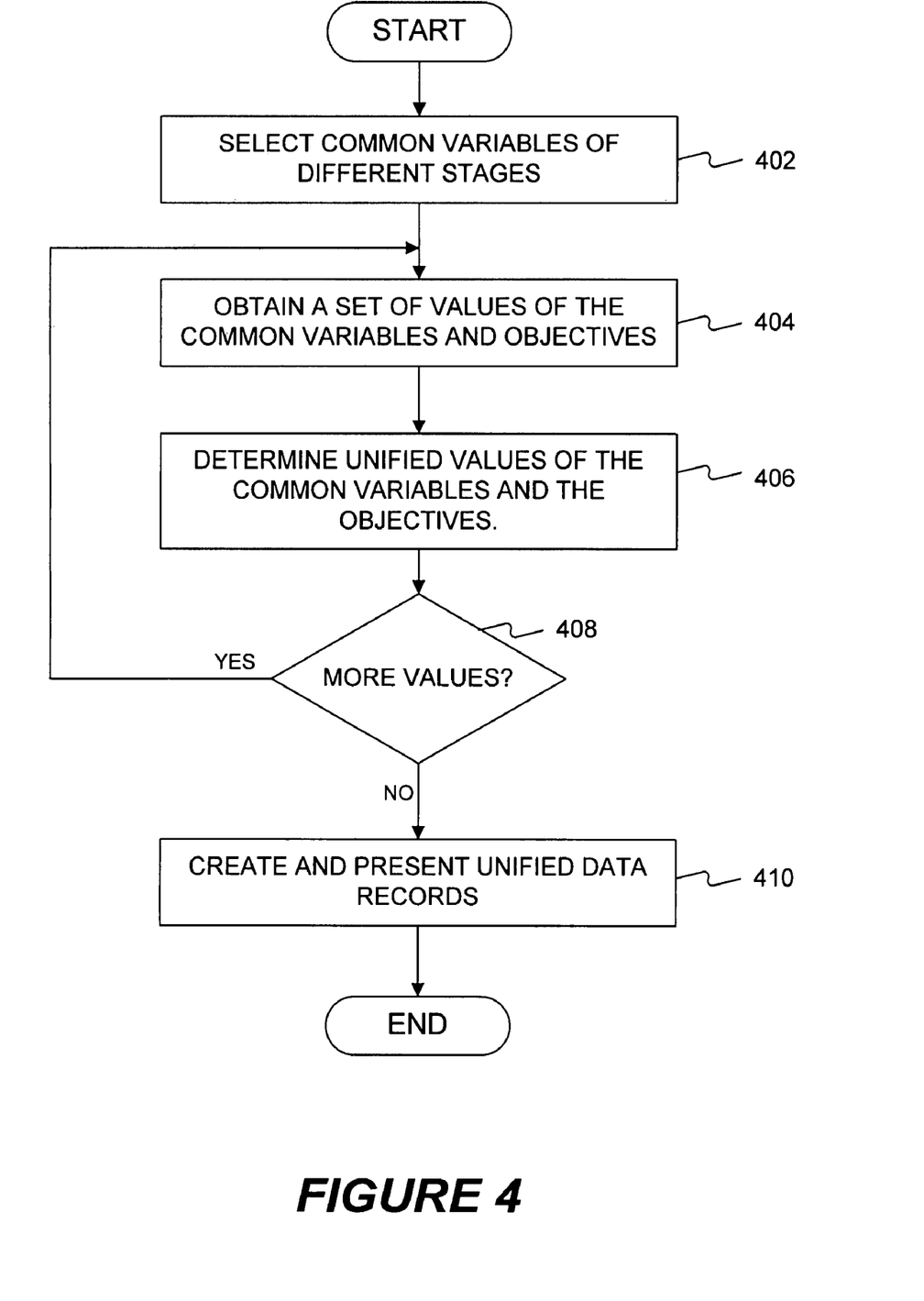
FIG. 4 shows an exemplary data adjustment process consistent with the disclosed embodiments.

Optionally or alternatively, processor 102 may also adjust current data records to create desired data records (step 310). As explained above, in certain embodiments, different stages may use different models to represent interrelationship between individual objectives and respective objective factors, which may resulting inconsistent or discontinuous data records. Processor 102 may perform a data adjustment process to consolidate the data records obtained from different stages and/or different models. FIG. 4 shows an exemplary data adjustment process consistent with the disclosed embodiments.

As shown in FIG. 4, processor 102 may select common variables associated with different stages of the product design and development (step 402). In the above example, processor 102 may select geometry and tolerances, component features, and material properties, etc., as common variables. Further, processor 102 may obtain a set of values for the common variables and objectives of all the stages (step 404).

The set of values of the variables and objectives may be referred to as an instance of the variables and the objectives (a data record) with each variable and/or objective having a particular value from a particular stage. For example, an instance from a concept design stage may include values of the common variables and the performance; an instance from a pilot stage may include values of the common variables, the performance, and the cost; an instance from a production design stage may include values of the common variables, the quality, and the cost; an instance from a strategy stage may include values of the common variables, the performance, the quality, and the cost. Further, processor 102 may obtain the set of values from any appropriate sources, such as database 106.

After obtaining the set of values of the common variables and the objectives (step 404), processor 102 may determine unified values of the common variables and the objectives corresponding to the set of values of variables and the objective (step 406).

Processor 102 may determine the unified values by combining the respective values of the common variables and the objectives. In certain embodiments, processor 102 may perform the combination based on the concept of the Euclidean (geometric) distance. For example, each stage may be represented by an axis or a dimension in an Euclidean space. A particular axis may represent any particular common variable or objective that a particular stage generates. Therefore, multiple stages may create multiple axes or multiple dimensions in the Euclidean space with each axis representing the particular common variables and objectives generated by each particular stage.

Processor 102 may determine the unified common variable and objective values as points in the multiple-dimension Euclidean space, whose position may be determined by the respective coordinates, i.e., values of the respective common variables and objectives, of the multiple axes or dimensions. For example, processor 102 may determine the value of a unified common variable or objective as the distance between the origin (0) and the multiple-dimension point.

For the engine design example above, for illustrating purpose, if provided that only two stages (e.g., the concept design stage and the production stage) or axes are involved, the first stage (e.g., the concept design stage) may represent an x-axis and the second stage (e.g., the production stage) may represent a y-axis. For any value of the set of values of common variables and objectives (e.g., geometry and tolerances, component features, material properties, performance, quality, and cost, etc.), if the first stage has a corresponding value $x_1$ and the second stage has a corresponding value $y_1$, the unified value may be represented by a two-dimensional point $(x_1, y_1)$ with the value of $(x_1^2+y_1^2)^{1/2}$, the distance from the origin (0, 0) and $(x_1, y_1)$.

Similarly, for an m-dimensional space (e.g., with m stages), where m is an integer representing the total number of stages, any unified value may be represented by an m-dimensional point $(x_1, x_2, x_3, \ldots, x_m)$, where $x_m$ (m=1, 2, ..., m) represents m coordinates, individual values of corresponding stages. The unified value may then be $(x_1^2 + x_2^2 + \ldots + x_m^2)^{1/2}$. Although only 2-norm distance is used in the examples above, other norms may also be used. Further, other types of distances, such as arithmetic mean, geometric mean, logarithmic scaling, Mahalanobis distance, etc., may also be used to combine the individual values of common variables and objectives.

After determining the unified values (step 406), processor 102 may include the unified values in the data records containing the common variables and objectives of the multiple stages. Processor 102 may further determine whether more values or more data records need to be analyzed (step 408). If processor 102 determines that more data records need to be analyzed (step 408; yes), processor 102 may continue the data adjustment process from step 404. On the other hand, if processor 102 determines that no more data record needs to be analyzed (step 408; no), processor 102 may proceed to create and present unified data records (step 410).

Processor 102 may combine data records from the multiple stages using the unified values. For example, processor 102 may replace the corresponding data records from the multiple stages with the unified data records including unified values of the common variables and the objectives, and may create a new database containing all the replacement data records. Optionally, processor 102 may also present the unified data records to a user of design system 100 via, for example, display 112, or present the unified data records to other application programs or systems.

Returning to FIG. 3, after adjusting the data records (step 310), processor 102 may determine output parameters corresponding to the objectives (step 312). For example, processor 102 may determine all objectives as output parameters of process models associated with the product design.

Figure 5:
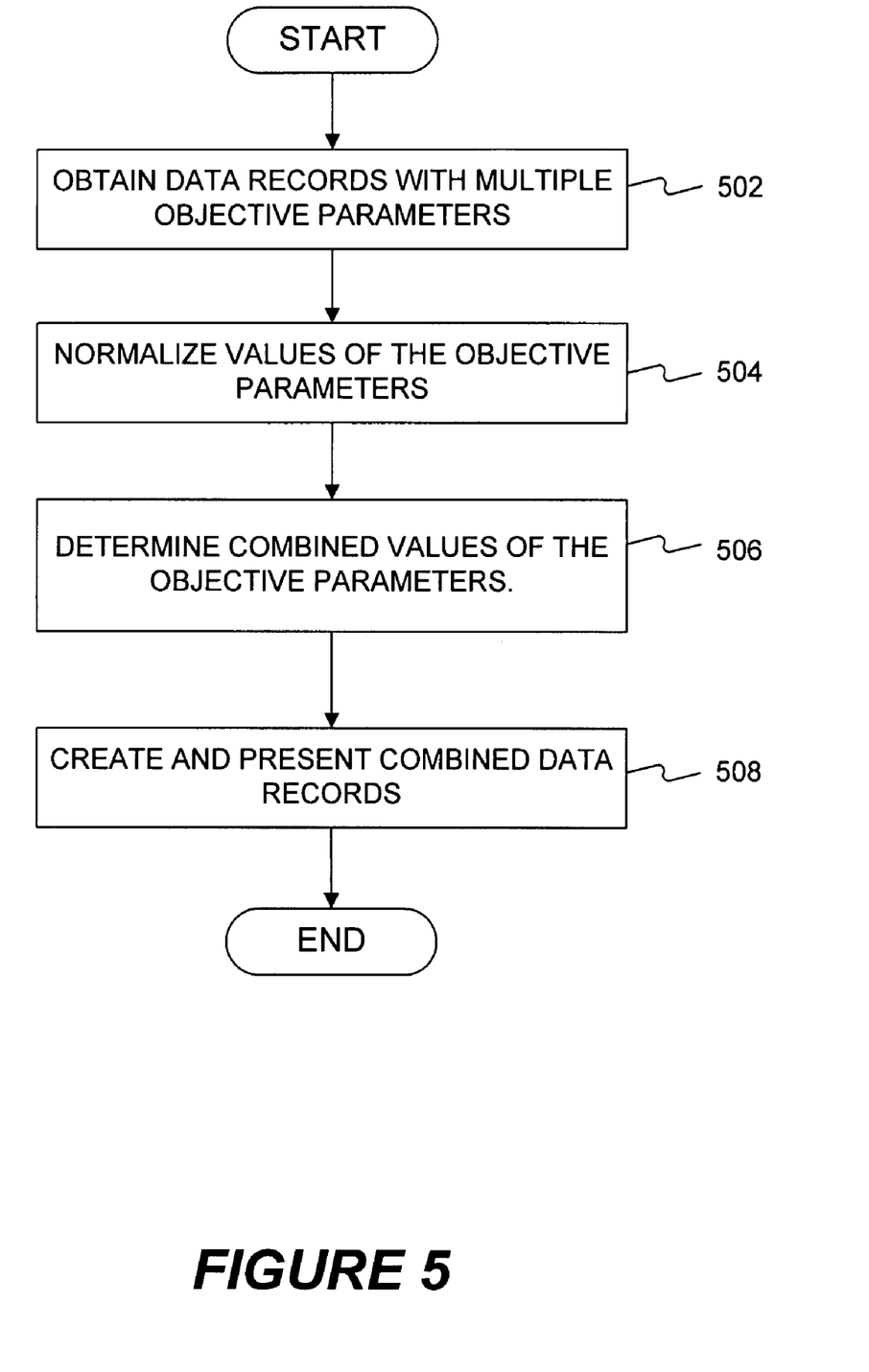
FIG. 5 shows an exemplary parameter combination process consistent with the disclosed embodiments.

In certain embodiments, however, an objective may be represented by more than one objective parameters, i.e., any appropriate parameter associated with the objective and indicative the characteristics of the objective. For example, as explained above, quality may be represented by parameters such as durability, warranty exposure, and/or defect over unit ratio, etc. Optionally, processor 102 may perform a parameter combination process to combine the more than one parameters into a single parameter representing the objective. FIG. 5 shows an exemplary parameter combination process consistent with the disclosed embodiments.

As shown in FIG. 5, processor 102 may obtain data records associated with multiple objective parameters (step 502). For example, processor 102 may obtain data records associated with durability, warranty exposure, and defect over unit ratio of the quality objective. Further, optionally, processor 102 may normalize the values of the multiple objective parameters (step 504). The term "normalize," as used herein, may refer to any appropriate operation to make values of the multiple objective parameters on a same or substantially similar scale. For example, with respect to quality objective, the warranty exposure may have a value with a large monetary number, while the defect over unit ration may have a small number. Therefore, the absolute values of the multiple parameters may be different enough such that a combination of these values may cause undesired emphasis or omission of any one of the multiple parameters.

Processor 102 may normalize the values of the multiple objective parameters by any appropriate algorithm. For example, processor 102 may replace a value of a particular parameter with a percentage value, derived from the value over a valid range of values of the particular parameter. For example, if a value of the warranty exposure is $800, and the range of the warranty exposure is $0-$1,600, the value of the warranty exposure may then be replaced with 50, i.e., the percentage of $800 over $1,600. For another example, if a value of the durability, as represented by total repair time over lifetime of a product, is 0.00002, and the range of the durability is 0-0.0001, the value of the durability may then be replaced with 20, i.e., the percentage of 0.00002 over 0.0001. Therefore, the replaced values of the warranty exposure and the durability may be on the same scale for more desired combination. Other algorithms, however, may also be used.

Processor 102 may further determine combined values of the objective parameters (step 506). For example, processor 102 may perform the combination based on the concept of the Euclidean (geometric) distance, as explained above. For example, each parameter may be represented by an axis or a dimension in an Euclidean space. A particular axis may represent a particular parameter. Therefore, multiple parameters may create multiple axes or multiple dimensions in the Euclidean space with each axis representing the particular parameter.

Processor 102 may determine the combined parameter as points in the multiple-dimension Euclidean space, whose position may be determined by the respective coordinates, i.e., values of the respective parameters, of the multiple axes or dimensions. Processor 102 may determine the value of a combined parameter as the distance between the origin (0) and the multiple-dimension point.

For an m-dimensional space (e.g., with m parameters), where m is an integer representing the total number of parameters, any combined value may be represented by an m-dimensional point $(x_1, x_2, x_3, \ldots, x_m)$ where $x_m$ (m=1, 2, ..., m) represents m coordinates, individual values of corresponding parameters. The combined value may then be $(x_1^2 + x_2^2 + \ldots + x_m^2)^{1/2}$. Although only 2-norm distance is used in the examples above, other norms may also be used. Further, other types of distances, such as arithmetic mean, geometric mean, logarithmic scaling, Mahalanobis distance, etc., may also be used to combine the individual values of common variables and objectives.

After determining the combined values (step 506), processor 102 may create and present combined data records. For example, processor 102 may replace the values of the multiple parameters in the data records with the combined values representing a single objective, and may also create a new database containing all the replaced data records. Optionally, processor 102 may also present the unified data records to a user of design system 100 via, for example, display 112, or present the unified data records to other application programs or systems.

Returning to FIG. 3, after combined the multiple objective parameters into a single parameter representing the corresponding objective, processor 102 may include the single parameter, together with other objectives, as output parameters for process modeling.

Returning to FIG. 2, after selecting input parameters (step 206), processor 102 may generate a computational model to build interrelationships between the input parameters and output parameters (step 208). Any appropriate type of neural network may be used to build the computational model. The type of neural network models used may include back propagation, feed forward models, cascaded neural networks, and/or hybrid neural networks, etc. Particular types or structures of the neural network used may depend on particular applications. Other types of models, such as linear system or non-linear system models, etc., may also be used.

The neural network computational model may be trained by using selected data records. For example, the neural network computational model may include a relationship between output parameters (e.g., quality, performance, and cost, etc.) and input parameters (e.g., geometry and tolerances, such as cylinder wall thickness, cylinder wall material, cylinder bore, etc., component features, and material properties, etc.). The neural network computational model may be evaluated by predetermined criteria to determine whether the training is completed. The criteria may include desired ranges of accuracy, time, and/or number of training iterations, etc.

After the neural network has been trained (i.e., the computational model has initially been established based on the predetermined criteria), processor 102 may statistically validate the computational model (step 210). Statistical validation may refer to an analyzing process to compare outputs of the neural network computational model with actual outputs to determine the accuracy of the computational model. Part of the data records may be reserved for use in the validation process. Alternatively, processor 102 may generate simulation or test data for use in the validation process.

Once trained and validated, the computational model may be used to determine values of output parameters when provided with values of input parameters. Further, processor 102 may optimize the model by determining desired distributions of the input parameters based on relationships between the input parameters and desired distributions of the output parameters (step 212).

Processor 102 may analyze the relationships between distributions of the input parameters and desired distributions of the output parameters (e.g., design constraints provided to the model that may represent a state of compliance of the product design). Processor 102 may then run a simulation of the computational model to find statistical distributions for an individual input parameter. That is, processor 102 may separately determine a distribution (e.g., mean, standard variation, etc.) of the individual input parameter corresponding to the ranges of the output parameters representing a compliance state for the product. Processor 102 may then analyze and combine the desired distributions for all the individual input parameters to determined desired distributions and characteristics for the input parameters.

Alternatively, processor 102 may identify desired distributions of input parameters simultaneously to maximize the probability of obtaining desired outcomes (i.e., to maximize the probability that a certain product design is compliant with the desired requirements). In certain embodiments, processor 102 may simultaneously determine desired distributions of the input parameters based on zeta statistic. Zeta statistic may indicate a relationship between input parameters, their value ranges, and desired outcomes. Zeta statistic may be represented as:

$$\zeta = \sum_{1}^{j} \sum_{1}^{i} |S_{ij}| \left(\frac{\sigma_i}{\bar{x}_i}\right) \left(\frac{\bar{x}_j}{\sigma_j}\right), \quad (2)$$

where $\bar{x}_i$ represents the mean or expected value of an ith input; $\bar{x}_j$ represents the mean or expected value of a jth outcome; $\sigma_i$ represents the standard deviation of the ith input; $\sigma_j$ represents the standard deviation of the jth outcome; and $|S_{ij}|$ represents the partial derivative or sensitivity of the jth outcome to the ith input.

Processor 102 may identify a desired distribution of the input parameters such that the zeta statistic of the neural network computational model is maximized or optimized. A genetic algorithm may be used by processor 102 to search the desired distribution of input parameters with the purpose of maximizing the zeta statistic. Processor 102 may select a candidate set of input parameters with predetermined search ranges and run a simulation of the product design model to calculate the zeta statistic parameters based on the input parameters, the output parameters, and the neural network computational model. Processor 102 may obtain $\bar{x}_i$ and $\sigma_i$ by analyzing the candidate set of input parameters, and obtain $\bar{x}_j$ and $\sigma_j$ by analyzing the outcomes of the simulation. Further, processor 102 may obtain $|S_{ij}|$ from the trained neural network as an indication of the impact of ith input on the jth outcome.

Processor 102 may select the candidate set of values of input parameters if the genetic algorithm converges (i.e., the genetic algorithm finds the maximized or optimized zeta statistic of the product design model corresponding to the candidate set of input parameters). If the genetic algorithm does not converge, a different candidate set of values of input parameters may be created by the genetic algorithm for further searching. This searching process may continue until the genetic algorithm converges and a desired set of values of the input parameters is identified. Processor 102 may further determine desired distributions (e.g., mean and standard deviations) of input parameters based on the desired set of values of input parameters.

A design solution with a maximal zeta statistic value, e.g., a zeta statistic value exceeding a predetermined threshold, may be robust in the sense that maximal input variability results in minimal output variability. In addition to robustness, the degree of output compliance can also be a significant factor to consider for the success of a candidate design. The capability statistic $C_{pk}$ may describe the degree of output compliance of a design as $$C_{pk} = \min\left\{\frac{USL - \bar{x}_j}{3\sigma_j}, \frac{\bar{x}_j - LSL}{3\sigma_j}\right\}, \quad (3)$$

where $C_{pk}$ is the capability index; USL and LSL are the upper and lower specification limits of the jth output, respectively, and $\bar{x}_j, \sigma_j$ are the mean and standard deviation respectively of the jth output.

Further, zeta statistic optimization may involve maximizing the term $\zeta * C_{pk,min}$, where $C_{pk,min}$ is the process capability of the output least in control of the 1 . . . j outputs under consideration at any given iteration of the genetic algorithm process. A solution that maximizes the term; $\zeta * C_{pk,min}$ may simultaneously robust and maximally compliant.

After the product design model has been optimized (step 212), processor 102 may define a valid input space (step 214) representative of an optimized design of the product. This valid input space may represent the nominal values and corresponding statistical distributions for each of the selected input parameters. To implement the design of the product, values for the input parameters selected within the valid input space would maximize the probability of achieving a compliance state according to the constraints provided to the model as LSL and USL terms described previously.

Once the valid input space has been determined, this information may be provided to display 112. Along with the input space information, other process model information such as the nominal values of the corresponding output parameters and the associated distributions may also be supplied to display 112. Displaying this information conveys to the product design engineer the ranges of values for the selected input parameters that are consistent with the optimized product design. This information also enables the engineer to determine the probability of compliance of any one of or all of the output parameters in the optimized product design.

While the processor 102 may be configured to provide an optimized product design based on the interrelationships between the selected input parameters and the output parameters and on the selected output constraints, the model allows for additional input by the product design engineer. Specifically, at step 218, the engineer is allowed to determine if the optimized product design generated by processor 102 represents the desired final design. If the answer is yes (step 218, yes), then the process ends. If the answer is no (step 218, no) the engineer can generate a design alternative (step 220).

To generate a design alternative, the engineer can vary any of the values of the input parameters or the distributions associated with the input parameters. The changed values may be supplied back to the simulation portion of the model. Based on the changed values, the model will display updated values and distributions for the output parameters changed as a result of the change to the input parameters. From the updated information, the engineer can determine how the alternative product design impacts the probability of compliance as measured by $C_{pk}$ or any other appropriate capability statistic. This process can continue until the engineer decides on a final product design. It should be noted that alternative designs may also be generated by varying the values or distributions for the output parameters or by defining different or additional product design constraints.

Display 112 may also be used to display statistical information relating to the performance of the product design model. For example, distributions for the input parameters and the output parameters may be calculated based on the original data records. These distributions may represent an actual statistical space that can be compared with a predicted statistical space generated by the model. Overlap of the actual statistical space with the predicted statistical space may indicate that the model is functioning as expected.

INDUSTRIAL APPLICABILITY

The disclosed systems and methods may efficiently provide optimized product designs for any type of product that can be modeled by computer. Based on the disclosed system, complex interrelationships may be analyzed during the generation of computational models to optimize the models by identifying distributions of input parameters to the models to obtain desired outputs. The robustness and accuracy of product designs may be significantly improved by using the disclosed systems and methods.

The efficiency of designing a product may also be improved using the disclosed systems and methods. For example, the disclosed zeta statistic approach yields knowledge of how variation in the input parameters translates to variation in the output parameters. Thus, by defining the interrelationships between the input parameters and the output parameters in a system, the disclosed product design system can operate based on a proxy concept. That is, because these interrelationships are known and modeled, there is no need to use domain specific algorithm tools each time the model wishes to explore the effects of a variation in value or distribution of an input parameter or output parameter. Thus, unlike traditional systems that must pass repeatedly pass through slow simulations as part of a design optimization process, the disclosed modeling system takes advantage of well-validated models (e.g., neural network models) in place of slow simulations to more rapidly determine an optimized product design solution.

The disclosed product design system can significantly reduce the cost to manufacture a product. Based on the statistical output generated by the model, the model can indicate the ranges of input parameter values that can be used to achieve a compliance state. The product design engineer can exploit this information to vary certain input parameter values without significantly affecting the compliance state of the product design. That is, the manufacturing constraints for a particular product design may be made less restrictive without affecting (or at least significantly affecting) the overall compliance state of the design. Relaxing the manufacturing design constraints can simplify the manufacturing process for the product, which can lead to manufacturing cost savings. Additionally, product cost may be considered as an explicit output during optimization The disclosed product design system can also enable a product design engineer to explore "what if" scenarios based on the optimized model. Because the interrelationships between input parameters and output parameters are known and understood by the model, the product designer can generate alternative designs based on the optimized product design to determine how one or more individual changes will affect the probability of compliance. While these design alternatives may move away from the optimized product design solution, this feature of the product design system can enable a product designer to adjust the design based on experience. Specifically, the product designer may recognize areas in the optimized model where certain manufacturing constraints may be relaxed to provide a cost savings, for example. By exploring the effect of the alternative design on product compliance probability, the designer can determine whether the potential cost savings of the alternative design would outweigh a potential reduction in probability of compliance.

The disclosed product design system can also provide various data pre-processing mechanisms to improve the accuracy of the data records, and/or to reduce total number of the input or output variables without losing characteristics of the data records. Further more, the disclosed product design system may integrate different models and/or data records from different stages of the development of the product. The integrated model can be used consistently by the different stages to reduce inconsistency and to improve model accuracy. Therefore, significant cost saving may be achieved by using same data characteristics during different stages of the product development.

The disclosed product design system has several other advantages. For example, the use of genetic algorithms at various stages in the model avoids the need for a product designer to define the step size for variable changes. Further, the model has no limit to the number of dimensions that can be simultaneously optimized and searched.

Other embodiments, features, aspects, and principles of the disclosed exemplary systems will be apparent to those skilled in the art and may be implemented in various environments and systems.

What is claimed is:

1. A method for developing a product, comprising:
    obtaining data records from a plurality of stages of development of the product;
    identifying respective objectives of the plurality of stages and corresponding objective factors of the objectives;

determining common variables associated with the objectives based on the objective factors;

selecting one or more input parameters based on the common variables and one or more output parameters based on the objectives;

updating the data records to generate desired data records indicative of characteristics of the one or more input parameters and the one or more output parameters;

generating a computational model indicative of interrelationships between the one or more input parameters and the one or more output parameters based on the data records; and providing a set of constraints to the computational model representative of a design of the product.

2. The method according to claim 1, further including:

using the computational model and the provided set of constraints to generate statistical distributions for the one or more input parameters and the one or more output parameters, wherein the one or more input parameters and the one or more output parameters represent a design for the product.

3. The method of claim 2, wherein using the computational model further includes:

obtaining respective ranges of the input parameters;

creating a plurality of model data records based on the respective ranges of the input parameters;

determining a candidate set of values of input parameters using the plurality of model data records;

determining the statistical distributions of the one or more output parameters based on the candidate set; and searching the input parameters to maximize a zeta statistic, wherein the zeta statistic $\zeta$ is represented by:

$$\zeta = \sum_{1}^{j} \sum_{1}^{i} |S_{ij}| \left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the computational model.

4. The method of claim 3, wherein the searching is based on a genetic algorithm.

5. The method of claim 3, wherein the searching includes calculating a capability statistic $C_{pk}$ by $$C_{pk} = \min\left\{\frac{USL - \bar{x}_j}{3\sigma_j}, \frac{\bar{x}_j - LSL}{3\sigma_j}\right\},$$

provided that USL and LSL represent the upper and lower specification limits of the jth output, respectively, and $\bar{x}_j, \sigma_j$ represent the mean and standard deviation of the jth output, respectively.

6. The method according to claim 1, wherein the plurality of stages include a strategy stage, a concept design stage, a development stage, and a production stage.

7. The method according to claim 1, wherein the objectives includes a quality objective, a performance objective, and a cost objective.

8. The method according to claim 1, wherein updating the data records further includes:

obtaining values of the common variables and the objectives of each of the plurality of stages;

determining unified values of the common variables and the objectives based on the values of the common variables and the objectives of each of the plurality of stages; and generating the desired data records based on the unified values of the common variables and the objectives.

9. The method according to claim 8, wherein determining further includes:

determining the unified values based on multi-dimension distances, wherein each dimension represents one of the plurality of stages.

10. The method according to claim 1, wherein updating the data records further includes:

obtaining values of a plurality of objective parameters associated with an objective of one of the plurality of stages;

normalizing the values of the plurality of objective parameters;

determining a combined value of the objective representing the values of the plurality of objective parameters; and generating the desired data records based on the combined value of the objective.

11. The method according to claim 10, wherein the normalizing further includes:

normalizing each of the values based on a percentage of the each of the values over a corresponding range of the each of the values.

12. The method according to claim 10, wherein determining further includes:

determining the combined value of the objective based on a multi-dimension distance, wherein each dimension represents one of the plurality of objective parameters.

13. A computer-based product design system, comprising:

a database containing data records relating to a plurality of stages of development of the product; and a processor configured to:

obtain the data records associated with the plurality of stages;

identify respective objectives of the plurality of stages and corresponding objective factors of the objectives;

determine common variables associated with the objectives based on the objective factors;

select one or more input parameters based on the common variables and one or more output parameters based on the objectives;

update the data records to generate desired data records indicative of characteristics of the one or more input parameters and the one or more output parameters;

generate a computational model indicative of interrelationships between the one or more input parameters and the one or more output parameters based on the data records; and provide a set of constraints to the computational model representative of a design of the product.

14. The computer system according to claim 13, wherein the processor is further configured to:

use the computational model and the provided set of constraints to generate statistical distributions for the one or more input parameters and the one or more output parameters, wherein the one or more input parameters and the one or more output parameters represent a design for the product.

15. The computer system of claim 14, wherein, to use the computational model, the processor is further configured to:

obtain respective ranges of the input parameters;

create a plurality of model data records based on the respective ranges of the input parameters;
determining a candidate set of values of input parameters using the plurality of model data records;
determining the statistical distributions of the one or more output parameters based on the candidate set; and
searching the input parameters to maximum a zeta statistic, wherein the zeta statistic $\zeta$ is represented by:

$$\zeta = \sum_{1}^{j} \sum_{1}^{i} |S_{ij}| \left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the computational model.

16. The computer system according to claim 13, wherein the plurality of stages include a strategy stage, a concept design stage, a development stage, and a production stage.

17. The computer system according to claim 13, wherein the objectives includes a quality objective, a performance objective, and a cost objective.

18. The computer system according to claim 13, wherein, to update the data records, the processor is further configured to:
obtain values of the common variables and the objectives of each of the plurality of stages;
determine unified values of the common variables and the objectives based on the values of the common variables and the objectives of each of the plurality of stages; and
generate the desired data records based on the unified values of the common variables and the objectives.

19. The computer system according to claim 18, wherein, to determine the unified values, the processor is further configured to:
determine the unified values based on multi-dimension distances, wherein each dimension represents one of the plurality of stages.

20. The computer system according to claim 13, wherein, to update the data records, the processor is further configured to:
obtain values of a plurality of objective parameters associated with an objective of one of the plurality of stages;
normalize the values of the plurality of objective parameters;
determine a combined value of the objective representing the values of the plurality of objective parameters; and
generate the desired data records based on the combined value of the objective.

21. The computer system according to claim 20, wherein, to normalize the values, the processor is further configured to:
normalize each of the values based on a percentage of the each of the values over a corresponding range of the each of the values.

22. The computer system according to claim 21, wherein, to determine the combined value, the processor is further configured to:
determine the combined value of the objective based on a multi-dimension distance, wherein each dimension represents one of the plurality of objective parameters.

* * * * *